Oct. 28, 1969     R. E. THIERS     3,475,128

FLUID PROCESSING APPARATUS AND METHODS

Filed April 8, 1966     3 Sheets-Sheet 1

INVENTOR.
Ralph E. Thiers

BY

ATTORNEY

United States Patent Office 3,475,128
Patented Oct. 28, 1969

3,475,128
FLUID PROCESSING APPARATUS AND METHODS
Ralph E. Thiers, Durham, N.C., assignor to Bio-Science Laboratories, Van Nuys, Calif., a corporation of California
Filed Apr. 8, 1966, Ser. No. 541,306
Int. Cl. G01n 31/00
U.S. Cl. 23—230     24 Claims

ABSTRACT OF THE DISCLOSURE

Processing and analysis of a fluid such as required in analytical and preparative chemistry is achieved by method and apparatus dependent upon confining the fluid in a flexible conduit which establishes the processing path and whose wall is tightly compressed by appropriate sealing means which releasably seals the conduit at spaced points so as to effectively divide the entire conduit into a plurality of hydraulically isolated chambers. The sealing means moves and consequently the points of sealing and the chambers so formed simultaneously and progressively move along the path and the fluid is maintained divided in isolated units within respective chambers thereby allowing fluid to be admitted to, processed in, removed from or analyzed in each chamber independent of operations in other chambers.

---

This invention is concerned with apparatus and methods for performing various processes with fluids as, for example, in analytical or preparative chemistry and in which the fluids being processed are divided into isolated units and are processed while confined in a conduit.

The prior art concerned with process methods and apparatus of the kind with which the invention is concerned broadly divides itself into "batch processing" and "continuous processing." An example of batch processing is found in the practice of putting separate samples, e.g., blood, urine, water, gas or any fluid sample, in separate containers and treating such samples with separate portions of reagents while the samples are maintained out of contact with each other during processing. Such batch processing has been automated as illustrated in United States Patent 3,193,358 to Baruch. An example of continuous processing, a comparatively recent development, is illustrated by the methods and apparatus found in United States Patent 2,797,149 to Skeggs. In this form of processing, the samples flow in a stream in a conduit or tube and are introduced in a predetermined sequence. The air bubbles which form part of the stream greatly inhibit longitudinal mixing. For this reason, they appear to wash the walls of the conduit or tube as they move and such action is, of course, of great assistance in maintaining the samples as discrete entities. In both batch and continuous processing various approaches have been taken in the prior art with respect to adding and subtracting from the samples and for treating and analyzing the samples including steps such as heating, cooling, dialysis, mixing, colorimetry and the like.

Both batch and continuous apparatus and methods as presently developed inherently exhibit both desirable and undesirable characteristics. For example, the batch process insures absolute isolation between samples whereas in a continuous process isolation is not absolute and, in fact, diffusion of samples may occur. Batch process apparatus also has an advantage in that the process steps are generally independent of time between steps whereas with a continuous process, if the flow rate changes or if processing is actually stopped, the results being sought are directly affected. The methods and apparatus employed with the continuous process, on the other hand, offer an advantage in that processing can be completed very rapidly on large numbers of samples. Another advantage in the continuous type processing is that analysis operations may be performed employing incomplete reactions since timing is an inherent part of the process whereas with batch processing it is generally essential for reactions to be complete before the analysis work can be properly undertaken or else time must be controlled as an additional factor. Steps such as filtration and addition are discontinuous in the case of batch processing but are necessarily continuous in the case of continuous processing. Furthermore, the batch and continuous processing are different in that in batch processing the samples move in the same or different receptacles to the various processing sites whereas in continuous processing the samples and related materials move but their container, i.e., the conduit in which the sample stream is flowing, remains stationary. While individual samples may be processed in batch processes without disturbing adjoining samples, there is no known practical way in continuous processes, for example, to add to or subtract from selected samples forming part of a continuous stream without disturbing adjoining samples. While other comparisons might be made, it is believed the above is sufficient to appreciate the significance of the present invention.

An object is to provide improved apparatus and methods for establishing and maintaining isolated samples for then performing predetermined programs of chemical or physical procedures on such samples as required, for example, in analytical and preparative chemistry.

Another object of the invention is to provide apparatus and methods in which the better features of both batch and continuous processing are retained in that the samples are completely isolated and adapted to be processed discontinuously if desired, as in batch processing, but are confined in a common envelope or conduit and also adapted to continuous processing and to processing while in a state of incomplete reaction.

Another object is to obtain in the described apparatus and methods advantages of simplicity, economy, ease of cleaning and maintenance and more stabilized calibration.

Another specific object is to provide continuous processing type apparatus and methods in which there is no significant diffusion between samples even though such samples remain confined in and move relative to a common conduit.

Another specific object is to provide continuous processing type apparatus and methods in which the samples may be moved continuously in a stream relative to a common conduit in which the samples are confined and during which process steps such as adding, subtracting, reacting and the like may be performed on individual samples without disturbing or affecting adjoining samples.

Another specific object is to provide continuous processing type apparatus and methods which during certain stages of operation may be operated with the samples held isolated and at stationary stations to facilitate observations, measurements or process operations on particular samples and the processing thereafter resumed on a continuous basis without affecting the state of the remaining samples involved in the processing.

Another object is to provide continuous processing type apparatus and methods in which means may be introduced for physically mixing materials constituting particular samples while such samples are moved in a common conduit and while preserving isolation between such samples.

Another object is to provide continuous processing type apparatus and methods which eliminate the need for continuously introducing air into the samples and for separating the samples by bubbles formed with such air.

Another object is to provide continuous type apparatus and methods which allow individual samples to be withdrawn out of the common stream of samples, operated on, measured, observed or the like while withdrawn and then replaced back into the stream in the same or a different relative position without disturbing the state of the remaining samples.

The foregoing and other objects of the invention will become apparent from the description which follows and from the drawings, in which:

FIGURE 12A illustrates a type of internal sealing that may be employed as a network to effect both division and recombining of units of fluid;

The fundamental character of the invention depends upon employment of a liquid container which is preferably but not necessarily in the form of an elongated tube or conduit, and which is further characterized by having a substantial portion of the wall of the conduit formed of a material which can be deformed by movement lateral to the longitudinal axis of the conduit to form a series of spaced hydraulic seals internally of the conduit and thereby form the conduit itself into a series of hydraulically isolated chambers. It should be noted here that progressively movable tube deformations have been employed on a limited scale in a known form of pumping liquid through a flexible walled tube. Variations on this method of pumping are illustrated, for example, in United States Patents 2,797,149 and 3,172,367. Another example appears in the New Orleans Medical and Surgical Journal 87: 386–389, December 1934. What actually happens in the case of these prior art pumping devices is that the flexible tube is simply compressed at some point to create a hydraulic seal internally of the tube and this point of compression is moved progressively along the tube in a given direction to create pressure on the fluid ahead. As this first point of compression is removed the seal which it has created is also removed or released and a subsequent point of compression will in the meantime have been created behind the first point and moved progressively along the tube in the same direction. In the usual type of pump of this kind there is a minimum of one and sometimes several points of compression moving at spaced distances along the tube and certain points are being periodically released and other points are being periodically formed so as to prevent back flow without using check valves and to create a head of pressure against the fluid being moved. While the amount of compression applied to the tube must be enough to create a pressure head, the seals need not necessarily be efficient or perfect hydraulic seals and in fact, dependent on such factors as tube internal diameter and the speed of progressive movement of the points of compression, a substantial amount of leakage can take place at the seals and still maintain enough pressure head for pumping purposes. Furthermore, where the pumping operation is ordinarily performed in a continuous process, fluid mixing is not a problem. See, for example, United States Patent 2,797,149. From the viewpoint of application to continuous processing as in analytical and preparative chemistry, for example, this approach to pumping or moving increments of fluid has several advantages in that the fluid can be handled externally of the conduit in which it flows and the conduit is not required to communicate with pump mechanisms or the like.

With the foregoing in mind the present invention takes a simple but radical approach to employment of a modified form of the concept just described. More specifically, the invention treats the establishment of a plurality of spaced hydraulic seals in a conduit or the like and the progressive movement of the seals as providing hydraulically isolated chambers which can be maintained and moved in some predetermined spaced relationship along some predetermined length of the conduit. That is, the first basic aspect of the invention to be understood is that the invention is directed to utilizing a conduit which can be deformed, a plastic tube being an example, establishing deformations at predetermined spaced intervals along the length of the conduit so as to create substantially perfect, or as close to perfect as is practical, hydraulic seals internally of the conduit at the points of deformation and thereby between such seals, chambers or voids capable of retaining fluids with each chamber being hydraulically isolated from each other chamber, and maintaining such seals in their spaced intervals while the seals are progressively moved along or relative to some predetermined length of the conduit corresponding to the length of conduit required for processing.

Considering what has just been stated certain basic distinctions between prior art practices and the invention make themselves apparent. In particular, when the concept of utilizing progressively moving pressure points is applied to a conduit such as a plastic tube holding a liquid for pumping purposes solely, the practice in the prior art is to establish the pressure points after the liquid is in the tube, to use the pressure points solely for the purpose of creating a pressure head, to maintain the pressure points along the length of the conduit which is generally extremely short and has no relation to the length of tube in which the fluid remains confined for the whole of its processing and to release the pressure points after they have moved along the tube for some predetermined short distance sufficient to establish the pressure head and in order that fluid can flow through the tube at the point where the pressure is released. The matter of maintaining a perfect hydraulic seal at each pressure point is not critical and mixing of the fluid on either side of the pressure points may take place both when the pressure points are being formed and released as well as while the pressure points are being moved progressively.

Comparing the methods and apparatus of the invention to the foregoing, the invention is directed to establishing and maintaining a plurality of spaced deformation or pressure points in a conduit such as a flexible plastic tube having a resilient or retractable type wall such that at each pressure point there is a substantially perfect hydraulic seal to prevent any transfer of liquid through the seal; a sufficient number of the pressure points are established at predetermined intervals along the length of the conduit in which the liquid is to be processed to insure that at all stages of processing in such length the seals remain effective and such length is substantially continuously divided at all times into a series of voids or chambers capable of confining increments of liquid such that the increment of liquid in each void or chamber is held hydraulically isolated from all other increments of liquid; the fluid does not flow as such but rather the increments of liquid are maintained hydraulically isolated and are caused to move along the tube or relative to the tube by reason of the pressure points being maintained and moved relative to the tube. That is, while the invention can be operated on a continuous basis in the sense of the increments of liquid moving in a substantially uninterrupted sequence along the length of tubing used in processing the liquid, the liquid is processed in a batch like manner in that the liquid is introduced and transported as increments and these increments do not form part of a stream as in prior art continuous processes.

Another aspect of the present invention is directed to employment of the just described hydraulically isolated chambers or voids for steps or stages of processing of liquids confined in such chambers. In connection with this it should be observed that in conventional pumping by the progressively moving pressure point concept even though chambers are formed between the pressure points and even though liquid is confined in such chambers while such chambers exist, the liquid is not processed and the conventional pumping apparatus does not lend itself to the liquid being processed while the liquid is in such chambers. It is only after the liquid has left the pumping environment and is free of any such chamber formations and is the form of a flowing stream that it is conventionally segmented by air bubbles and processing is begun. By "processing" at this point in the description is meant the performance of any typical process step such as adding or subtracting from the liquid, observing or measuring, filtering or the like. In contrast to the foregoing, processing according to the invention is effected on the liquids while the liquids are confined in the mentioned chambers. That is, the hydraulically isolated chambers are formed, the liquids are admitted to the chambers, the chambers are maintained in existence throughout processing of such liquids and even though a chamber, in effect, moves along the length of conduit or tube used in processing such liquid, the liquid in each chamber is maintained in hydraulic isolation from the liquid in all other chambers. Furthermore, according to the invention the chambers are treated as batch type containers in that liquids in each chamber are admitted, withdrawn and reacted or otherwise treated independently of what operations are performed on liquids in any other chambers.

To gain a full appreciation of the problem and its importance as well as an appreciation for the novelty and simplicity of the present invention, reference is made to United States Patent 3,148,037 which illustrates another prior approach for segmenting liquids and moving the segmented liquids along the length of a conduit in which the liquids are processed. United States Patent 3,036,894 indicates another approach of limited application but one which effectively requires that the container or conduit be consumed in the process of establishing the increments of liquid.

Figure 1:
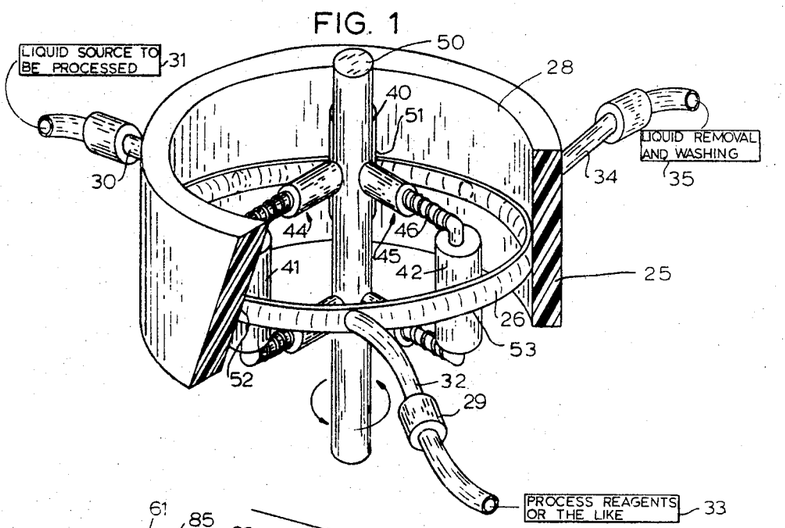
FIGURE 1 is a perspective, cut away, view of an apparatus embodying the invention.

Referring next to the drawings, FIGURE 1 illustrates somewhat schematically one basic form of the invention and in which 25 represents a cylindrical body of rigid material such as metal, hard plastic or the like. A flexible tube 26 which may be plastic or the like is secured to the inside wall 28 of the body 25. Tube 26 is a continuous tube of uniform internal diameter and the length of tube 26 is assumed to represent the length of tube required to complete some desired process such as determining the hemoglobin content of blood. A tube 30 mounts in the wall of the body and is arranged to communicate with tube 26 such that a liquid source such as a source of blood generally represented at 31 may be admitted to tube 26. Another tube 32 which is peripherally spaced from tube 26 is also mounted in the wall of body 25 and like tube 30 communicates with tube 26 such that a source of reagents or the like designated generally at 33 may be communicated to the liquid in tube 26 or the liquid in tube 26 communicated to the reagent source 33 dependent on the nature of the process. An additional tube 34 is mounted in the wall of body 25 and serves the purpose of removing the liquid after completion of processing as well as providing a means for admitting washing solutions or the like as generally designated at 35. Valves 29 may be employed to block the tubes 30, 32, 34 as desired.

A plurality of progressively movable, relatively fixedly spaced, substantially perfect hydraulic seals are provided by the apparatus which includes the three rollers 40, 41, 42 mounted on the respective arms 43 (not shown), 44 and 45. Arms 43, 44 and 45 are spring loaded as schematically represented by the springs 46 which are selected so that they will provide sufficient tension to effect substantially perfect hydraulic seals at those points where rollers 40, 41 and 42 compress the tube 26. At this point it should be stated that those observers of prior art practice appear not to have observed the fact that substantially perfect hydraulic seals can be established which effectively move along the length of a flexible tube or the like and that such length can be employed as a complete processing path. That is, prior observers have noted and practiced such a moving and squeezing concept for purposes of establishing a pressure head but without reference to or any consideration for whether or not a substantially perfect hydraulic seal was being established and employed, or at least the hydraulic seal has been thought of as a pressure device and not as a means for separating units of fluid which may be similar or dissimilar. The present invention, on the other hand, recognizes that with sufficient pressure and appreciation for the character of the conduit and pressure members essentially perfect hydraulic seals can be both established and maintained at several spaced points even though these seals move relative to the conduit.

Continuing the explanation of FIGURE 1, the roller structure is powered through a shaft 50 which is connected to a suitable source of low speed power, not shown. For example, assuming FIGURE 1 is essentially full scale such a source of power might operate shaft 50 at two to three revolutions per minute. As shaft 50 turns it can be seen that the hydraulic seals indicated at 51, 52 and 53 will progressively move along the length of tube 26 while maintaining their relative intervals or spacing fixed. Thus a "chamber" will be formed between rollers 41 and 42, a second chamber will appear between rollers 42 and 43, and a third chamber will appear between rollers 43 and 41 and each of these chambers will be hydraulically isolated one from the other by reason of the hydraulic seals established and continuously maintained by rollers 41, 42 and 43 and irrespective of whether or not rollers 41, 42 and 43 are moving. That is, unlike prior art continuous processes, the present invention apparatus and methods do not depend on continuous motion or flow of the liquid to maintain segmentation of the liquids into isolated units since shaft 50, for example, or its counterpart in other embodiments of the invention may be physically stopped and this will not affect the presence of the chambers which cause the various units of liquid to be hydraulically isolated. In the air bubble type of segmentation on the other hand if the flow of liquid stops or even changes its rate of movement the air bubbles may break up or alter their dynamic relationship, and undesirable longitudinal mixing is experienced.

As shaft 50 slowly rotates, it can be seen that the three chambers which are formed within the tube 26 between each pair of rollers and which gradually progress around the length of the tube remain hydraulically isolated one from the other such that fluids can be admitted, removed or treated in one chamber without disturbing the remaining chambers and even while other operations are being performed in the other chambers. Furthermore, all such operations may be conducted on a continuous basis in the sense that shaft 50 may be rotated relatively slowly which enables each chamber to remain isolated while it progressively changes position and for processing in such chamber to be completed during the course of such movement. At three revolutions per minute, for example, nine samples can be completely processed each minute.

Figure 2:
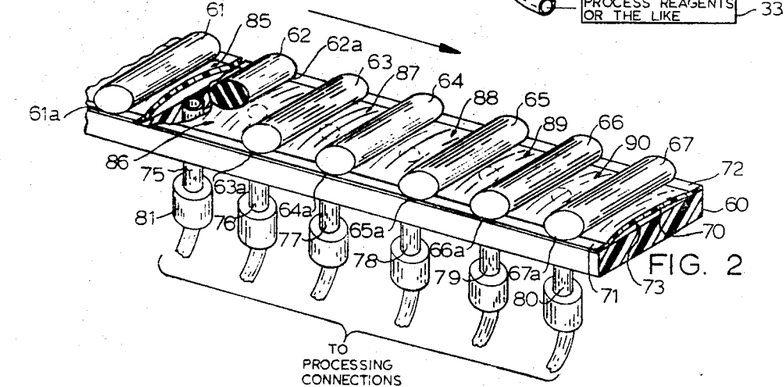
FIGURE 2 is a perspective view of another apparatus which may be cylindrical but which for illustration is shown laid out.
Figure 3:
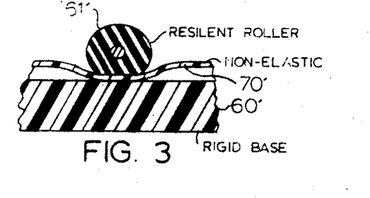
FIGURE 3 is a partial section view illustrating employment of a resilient roller.
Figure 4:
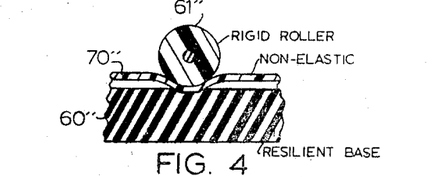
FIGURE 4 is a partial section view illustrating employment of a rigid roller.

Another somewhat generalized explanation of the invention is illustrated in FIGURE 2 in which the basic structure is developed as a planar rather than a cylindrical structure to show that the invention may be embodied in many of various structural forms. In FIGURE 2, the body 60 corresponds to the body 25 of FIGURE 1 and the rollers 61, 62, 63, 64, 65, 66 and 67 correspond to the rollers 40, 41 and 42. The numeral 70 designates a sheet of material which may be flexible or relatively inflexible as for example rubber, or any of various plastic sheet materials such as those sold under the trademarks Tygon, Teflon or the like. Sheet 70 is secured to the edges of body member 60 by means of a suitable adhesive applied along the edge adhesive lines 71, 72 such that the space or void between body 60 and sheet 70 provides a conduit like path capable of confining liquids to be processed. Body 60 like sheet 70 lends itself to being formed from any of various materials such as metal, any of the rigid plastics, hard rubber or the like. Likewise rollers 61 through 67 may be formed of various materials such as metal, hard rubber or the like. As indicated in FIGURES 3 and 4, the specific character of the body 60 and rollers 61 through 67 may vary in having the body represented by 60' in FIGURE 3 of a rigid material, the sheet represented by 70' of a non-elastic material and the rollers indicated by 61' of a resilient material. As illustrated in FIGURE 4, the base 60'' may be of a resilient material, the sheet 70'' of a non-elastic material and the roller 61'' of a rigid material, the purpose being to establish and maintain substantially perfect hydraulic seals at the various points of contact indicated at 61a, 62a, 63a, 64a, 65a, 66a and 67a.

To further illustrate the versatility of the invention, it will be noted that liquid inlet and outlet tubes are indicated at 75, 76, 77, 78, 79 and 80 each of which may be controlled by a valve 81. In operation, rollers 61 through 67 generally represent means for compressing or deforming the conduit path established by body member 60 and an envelope or sheet 70 such that substantially perfect hydraulic seals are established and maintained at each of the points 61a through 67a as such points move progressively along the length of such conduit path. Thus, as in FIGURE 1, there is established in FIGURE 2 between each pair of rollers such as rollers 61 and 62 a chamber or void at 85 which is and remains hydraulically isolated from all of the remaining chambers indicated at 86, 87, 88, 89 and 90. Assuming body member 60 and sheet 70 to be fixed, as rollers 61 through 67 move progressively at a relatively slow speed in the direction of the arrow shown in FIGURE 2 it will be seen that the chambers 85 through 90 and their contents also progressively move due to the progressive movement of the hydraulic seals established at 61a through 67a. Now as this progressive or relative movement between body 60 and rollers 61 through 67 is taking place, whatever liquids are involved in the particular process may be admitted, withdrawn, mixed or otherwise processed in the various chambers by means of the tubes 75 through 80 and such operations may be performed in chamber 85, for example, completely independent of operations performed in, say, chamber 86. Taking chamber 85 as a further example, it can be seen that when chamber 85 is at the position shown in FIGURE 2, liquids can be admitted, withdrawn or mixed by means of tube 75 without disturbing the contents of any of the remaining chambers. As chamber 85 progressively moves and assumes the position which chamber 86 occupies in FIGURE 2, the contents of chamber 85 can again be operated on through tube 76 and again this can be done independently of whatever operations are being performed in any of the remaining chambers.

Figure 5:
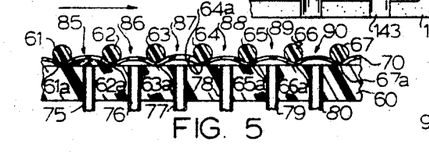
FIGURES 5 through 10 illustrate schematically various stages of movement of a unit of fluid relative to the conduit.
Figure 6:
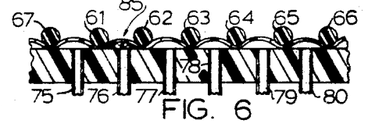
Figure 7:
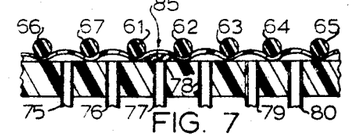
Figure 8:
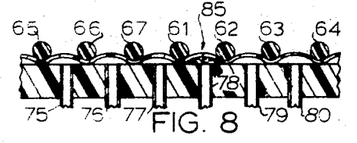
Figure 9:
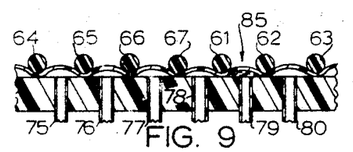
Figure 10:
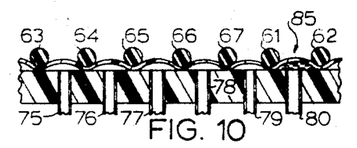

The movement of an individual chamber formation or void is further illustrated in FIGURES 5 through 10 in which what is regarded as chamber 85 is shown in various progressive stages of movement. It will, of course, be understood that in the embodiment of the invention being explained in reference to FIGURE 2 and FIGURES 5 through 10 the sheet or envelope 70 is integrally secured to the body member 60 and both sheet 70 and body 60 remain stationary while rollers 61 through 67 are progressively moved by means not shown. Thus, the word "chamber" is intended to mean the space established between a particular pair of rollers and, as such pair of rollers moves, the space between the rollers is necessarily moved or relocated even through the sheet 70 does not move; consequently, any liquid which is in a particular space or chamber between a particular pair of rollers will be progressively moved as the chamber in which it is confined moves. Comparing FIGURES 5 through 10, it will be seen that chamber 85 in FIGURE 5 is in communication with tube 75, in FIGURE 6 with tube 76, in FIGURE 7 with tube 77, in FIGURE 8 with tube 78, in FIGURE 9 with tube 79, in FIGURE 10 with tube 80. Such action enables chamber 85 to successively come into communication with the tubes 75 through 80 and at each undergo any desired type of fluid exchange involved in the particular process being followed. The liquid that is confined in chamber 85 in FIGURE 5 could be, say, liquid X and to this a new liquid Y could be admitted in the position of, say, FIGURE 7. It should also be understood that chambers ahead and behind chamber 85 could at any time contain the same or dissimilar units of fluid.

Figure 11:
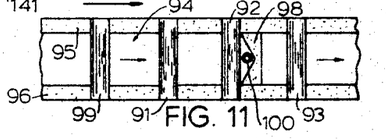
FIGURE 11 illustrates a type of internal seal that may be employed for draining the conduit at a location.

Other aspects of the invention will be discussed with reference to generalized diagrams. FIGURE 11 is a planar view in which the rollers used for developing the hydraulic seals are indicated at 99, 91, 92 and 93. The sheet 94 corresponds to the sheet 70 and the lines of adhesion of sheet 94 to the body member which is hidden from view are represented at 95, 96, these edge lines of adhesion corresponding to adhesions 71, 72 in FIGURE 2. In FIGURE 11, a further area or line of adhesion is indicated at 98 and this represents a permanent seal which may be developed either mechanically or by an appropriate adhesive so as to provide a permanent hydraulic seal just ahead of an outlet tube 100. That is, FIGURE 11 illustrates a positive means by which every chamber can be emptied through outlet 100. For example, assuming roller 92 is moving in the direction of the arrow, any fluid confined in the space between roller 92 and the line of adhesion 98 will be directed into the outlet 100 and thus forced out of the system.

Figure 12:
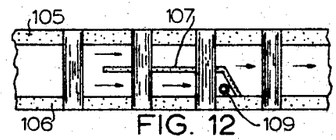
FIGURE 12 illustrates a type of permanent internal seal that may be employed to effect division of units of fluid.

Another requirement which is faced in processing apparatus is that of being able to divide and combine samples and the manner in which the invention lends itself to this requirement is illustrated by FIGURES 12 and 12A. In FIGURES 12 and 12A the edge adhesions 105, 106 correspond to the edge adhesions 71, 72. For purpose of splitting the fluid as it is moved, an additional bent adhesion line is employed as indicated at 107 such that as the rollers progress the fluid is divided and forced to pass on either side of line 107 as indicated by the arrows. By providing an outlet as indicated at 109 it can also be seen that some predetermined portion of the liquid can be withdrawn from each chamber as such chamber arrives at and moves past line 107 and outlet 109. In FIGURE 12A the adhesion lines 104 and 108 illustrate triple dividing by forming multiple sub-chambers, followed by recombining of the contents of two sub-chambers and followed by recombining of the contents of all sub-chambers. This same concept may be utilized in establishing parallel or series or various other flow networks as is sometimes found useful in analytical and preparative chemistry.

Figure 13:
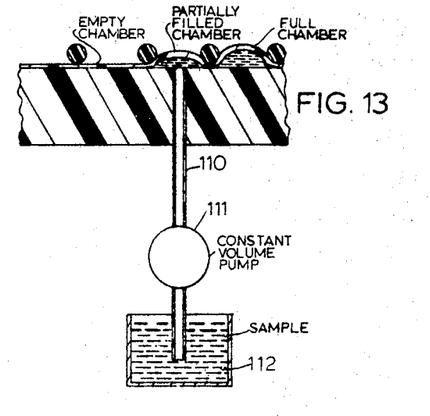
FIGURE 13 illustrates how a chamber may be filled with a known quantity of fluid at a station.

While the invention lends itself to various means of introducing liquids to the chambers, FIGURE 13 illustrates an arrangement wherein the rollers are assumed to be moving at a constant speed past an inlet tube 110 which is connected to a constant volume pump 111 which pumps from the sample source 112. Such an arrangement provides continuous introduction of the samples in equal volume per chamber which is equivalent to the conventional continuous processing apparatus and method but with the important exception that with the present invention there is zero interaction and zero longitudinal mixing between samples.

Figures 14, 15, 20, 21, 22:
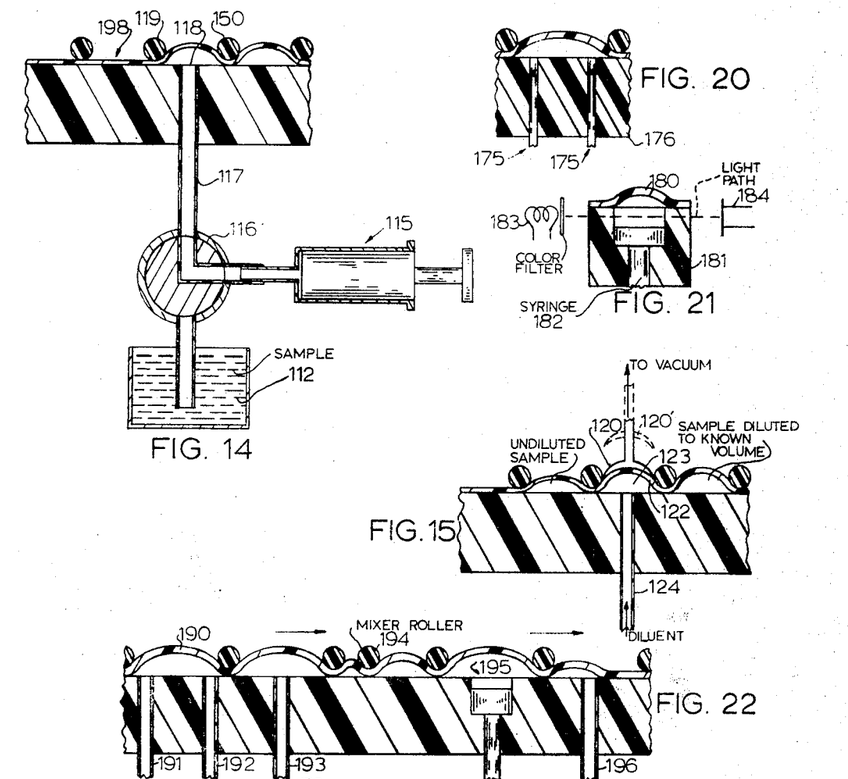
FIGURE 14 illustrates how a constant volume of fluid may be introduced independent of specific timing.
FIGURE 15 illustrates how a unit or sample of fluid may be diluted to a known volume.
FIGURE 20 illustrates employment of electrodes for pH measurements.
FIGURE 21 illustrates employment of an optical cuvet with the apparatus of the invention.
FIGURE 22 illustrates a comprehensive system following the invention.

In FIGURE 14, the volume of sample is controlled by an outside device, a syringe being indicated at 115 as an example, and which is connected to a barrel valve 116 which can be turned to draw from the sample 112 or force fluid into the inlet tube 117. Of particular significance here is that the sample can be injected without regard to timing as long as the port 118 is between the rollers as, for example, rollers 119, 150 and such injection can be rapid or slow. In fact, as previously mentioned, it has been found that the rollers can actually be stopped or operated by a program of indexing without introducing any intermixing between samples. This advantage gives the apparatus and methods of the invention the characteristic of batch processing but with the ability to operate as a continuous or semi-continuous process. Precise procedures according to the FIGURE 14 will vary with specific processes. For example, if desired each sample injection can be followed by injection of some known amount of wash solution such as water or air or a mixture of these in order to clear out the dead space in the injection port. Reagents or the like can also, of course, be added and removed by the techniques previously described.

Diluting to a known fixed volume according to the invention may be practiced in various ways. FIGURE 15, for example, illustrates a vacuum mold 120 which can be lowered from a raised position indicated at 120' to engage the sheet or envelope 122, corresponding to sheet 70 in FIGURE 2, so as to form the chamber below mold 120 into a void of known volume. That is, mold 120 is made with a known volume and shape and its engagement with the envelope 122 is arranged such that the chamber as indicated at 123 is established with a predetermined volume. In this condition the diluent is admitted through inlet tube 124 until such established volume is full which inherently brings the dilution to a known fixed volume. Other means may be employed for the same purpose such as relating volume to some predetermined pressure which has been calibrated to a particular volume. It should also be noted here that FIGURE 15 illustrates one means of accomplishing a pipetting type process operation in that if a known volume of liquid is in chamber 123, for example, the bringing of the volume of liquid in chamber 123 to some new known volume is effectively adding a volume equal to the difference.

Figure 16:
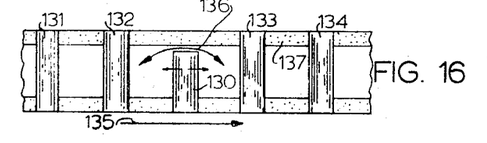
FIGURE 16 illustrates an auxiliary roller to accelerate mixing of fluid in a chamber.

Lateral mixing of process samples being transported longitudinally in a tube or conduit is desirable and the invention lends itself to various ways of mixing. FIGURE 16 illustrates, for example, a mechanical form of mixing and in which roller 130 represents a roller of somewhat shorter length than the other rollers indicated at 131, 132, 133 and 134. The rollers 131, 132, 133 and 134 move in a common direction as indicated by the arrow 135. Roller 130 is mounted on means, not shown but whose general structure will be apparent to those skilled in the art, which causes it to move back and forth relative to selected pairs of rollers which causes the liquid confined in the chamber established between, for example, rollers 132 and 133 to be squirted through the narrow area indicated at 136 between the end of roller 130 and the adhesion line 137. Roller 130 lifts by means not shown and return to its mixing position as the next chamber reaches the mixing position.

Figure 17:
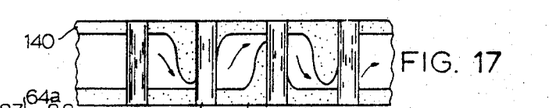
FIGURE 17 illustrates use of permanent internal seals to effect mixing.

Mixing may also be effected by use of adhesion lines which disturb the movement of the liquid in the chambers sufficient to cause mixing. An example of this is illustrated in FIGURE 17 in which the stippled areas 140, 141 represent areas in which the sheet or envelope corresponding to sheet 70 in FIGURE 2 is adhered to the body member corresponding to body 60 in FIGURE 2. From FIGURE 17 it can be seen as the chambers are formed by the rollers 143 and as the rollers and the chambers progressively move in the direction of the arrow shown in FIGURE 17, the fluid confined in the chambers will be caused to move back and forth and thus mixing will be effected, as with the structure of FIGURE 16, by turbulent flow through the narrow passages.

The invention also readily lends itself to process steps of heating and cooling. While not shown it will be obvious to those skilled in the art that heating of liquids confined in the chambers may be accomplished by bringing the chambers proximate a source of controlled heat or, if cooling is desired, by bringing the chambers proximate a coolant liquid or other heat extraction means. The invention also readily adapts itself to the step of volatilization in that the methods and apparatus of the invention are able to handle gases as well as liquids and therefore any means of volatilization of one or more constituents in a chamber can be used such as addition of a reagent which frees a gas, e.g., carbon dioxide, or heating to vaporize.

Employment of the invention for separation of fluids may be carried out in various ways. For example, if the apparatus of FIGURE 2 is oriented in a vertical plane and the separation step involves separation of gases and liquids, it can be seen that the gases can be extracted from the top of chambers by mounting certain of the tubes on top of the conduit. While not shown, by adopting conical geometry for the structure employed to practice the invention so that the body member takes the form of an inverted cone and the rollers or other compression devices are mounted on the wall of the cone, centrifuging may be accomplished. That is, by arranging the body member and conduit structure so that it is disconnected from any external tubes and is powered to rotate around its principal axis, rapid rotation of the entire apparatus will cause two dissimilar liquids to separate with one being forced to one edge and the other to the opposite edge of the conduit. Separation of solids from liquids is also possible by similar techniques except that solids of large particles will tend to agglomerate and separate by moving under the rollers into succeeding chambers. This action can, however, be taken advantage of by, for example, placing a wash fluid in the first succeeding chamber, i.e., the chamber which follows the chamber in which the solids originally appear, to wash out the remainder of the desired constituent from the precipitate for later combination with the liquids originally containing the solids. A dissolving fluid can be placed in the second such succeeding chamber to dissolve the precipitate for further use or for discard. Solvent extraction, another typical process step, is also readily practiced by use of the invention since reagents may be added, mixed and separation accomplished by the means already described.

Figure 18:
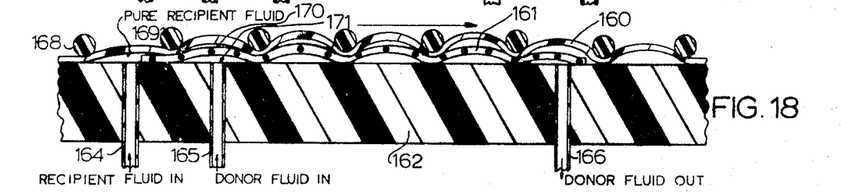
FIGURES 18 and 19 illustrate in elevation and plan respectively employment of an internal membrane and permanent hydraulic seals to effect dialysis.
Figure 19:
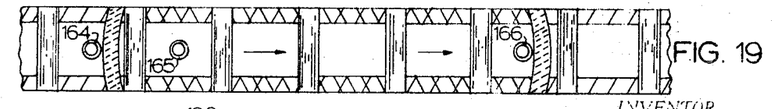

The process step of dialysis is one of considerable importance and may be effected in various ways within the scope of the invention. FIGURES 18 and 19 illustrate somewhat schematically a method and apparatus by which crystalloids may be transferred across a membrane internally of a chamber. In FIGURE 18 there is shown a schematic view in elevation of a dialysis arrangement and FIGURE 19 shows the same in a plan view. This arrangement employs an outer sheet 160 corresponding to sheet 70 of FIGURE 2, and an inner permeable membrane sheet 161. The $x$ cross hatching illustrates where both sheets are adhered to the body member 162, the slanted line hatching indicates where only the outer sheet 160 is adhered to the body member 162, and the dashed hatching indicates where only the inner sheet 161 is adhered to the body member 162. A tube 164 is adapted to admit the recipient fluid and a tube 165 admits the donor fluid. A tube 166 is adapted to discharge the donor fluid. As illustrated by FIGURES 18 and 19, as each pair of rollers, such as rollers 168, 169, move in the direction of the arrows shown in FIGURES 18 and 19 and arrive over tube 164, the recipient fluid is admitted to the chamber which is formed solely by the outer sheet or envelope 160 between rollers 168, 169. Continuing to use rollers 168 and 169 for reference, these rollers will move the recipient fluid until the chamber formed by rollers 168 and 169 with sheet 160 is over tube 165. At this stage, the donor fluid is admitted through tube 165 and is confined in the chamber formed by the inner sheet 161. That is, by securing the two sheets 160 and 161 along the lines of adhesion indicated in FIGURES 18 and 19, it becomes possible to effectively have two chambers between each pair of rollers. Thus, in FIGURE 18, chamber 170 which is formed between sheets 160 and 161 and above tube 165 is shown holding the recipient fluid and chamber 171 which is formed between sheet 161 and the body member 162 and above tube 165 is shown holding the donor fluid. Now, as the rollers 168, 169 move from left to right in FIGURES 18 and 19, it can be seen that dialysis can be effected between the donor fluid and the recipient fluid and the donor fluid will be forced out of tube 166 as the rollers move past tube 166. It may be noted that while adhesion has been mentioned as a securing means for the lines of adhesion such as, for example, those indicated in $x$ cross hatching in FIGURE 19, a liquid proof zipper type construction or similar releasable securing means may be employed to facilitate washing the various components. That is, selected lines of adhesion may be effected in some cases by mechanical releasable securing means rather than by using permanent adhesive materials on such lines of adhesion.

The application of pressure is sometimes required and in this regard it is noted that the apparatus previously discussed may be operated under pressure in a pressure chamber if desired or portions of the apparatus may be submerged in a heavy liquid such as mercury to obtain desired amounts of pressure. With regard to observation of the liquids confined in the chambers, pH electrodes or electrodes for other purposes may be installed in the body member as illustrated in FIGURE 20 in which 175 represents the electrodes and 176 the body member. Techniques of potentiometric, conductimetric, polargraphic and other measurements are readily applicable.

Optical observations such as colorimetry, spectrophotometry, florimetry, turbidimetry and nephelometry are important in analytical chemistry and in processing and an explanation will now be made of the application of the invention to such observations. Where qualitative information only is desired as, for example, in detecting, by the color, the end point of a titration is a given amount of liquid confined in a particular chamber, observation may simply be made by utilizing a transparent sheet as the conduit envelope. FIGURE 21 illustrates an optical cuvet and is assumed to show a sectional view taken through the body member and the sheet or envelope. In this case the sheet 180 is further assumed to contain a liquid of interest for optical observation and movement of the chambers is out of the page toward the reader. Built into the body member 181 is a syringe like structure 182 such that when the chamber holding the liquid of interest is over structure 182, the liquid of interest can be drawn down into the light path indicated between the light source 183 and the photocell 184. After the observation has been made the fluid is then forced back into the chamber by means of structure 182 and structure 182 is held in its raised position until it is desired to draw other liquids for optical observation. Two separate cells may be arranged to examine at two wave lengths simultaneously or a blank or standard liquid may be examined simultaneously with some unknown liquid. It is also important to recognize that it is not necessary to stop movement of the chambers to perform the desired examinations.

From the foregoing explanation, it can be seen that the invention lends itself to all of the conventional processing requirements. Of course, analytical and preparative procedures other than those referred to are used but it is believed that those skilled in the art will readily appreciate the modifications required to practice any procedure which was not discussed. Reference will now be made to a specific procedure and its application to the invention, namely, that of determining the hemoglobin content of blood as defined in the book Clinical Chemistry by Henry, published by Hoeber in 1964. In this procedure whole blood is diluted and laked (cells broken) with a 0.3% solution of the tetrasodium salt of EDTA (ethylenediamine tetracetic acid) and oxygenated by exposure to air. The oxyhemoglobin is measured by its absorbance at 540 m$\mu$. In the actual procedure, 5.0 milliliters of EDTA are measured into a cuvet. 0.020 milliliter of whole blood is then pipetted in after which the solution is stoppered and shaken several times to mix the reagents together and with air. The absorbance is measured at 540 m$\mu$ in 1 centimeter path length cuvet. The grams of hemoglobin per 100 milliliters of blood is equal to the result of multiplying the absorbance by a known constant.

The same procedure when performed according to the invention is explained in reference to FIGURE 22 which shows in a planar diagram an apparatus which could actually partake of a cylinder construction as in FIGURE 1. In FIGURE 22, the sheet or envelope 190 is assumed to be cylindrical and have five chamber spaces two centimeters by two centimeters each, the diameter of the cylinder forming the envelope being 3.2 centimeters or 1.25 inches. As shown in FIGURE 22, air in the required quantity is injected in tube 191 and the EDTA solution is injected in tube 192. The blood sample is injected in tube 193 and mixing is effected by the mixing roller 194. During the period of time that the sample is opposite the optical cuvet 195, the sample is withdrawn, measured and restored to its chamber. After this, the sample is discharged through tube 196. While there is no inherent limit to the rate of operation, a typical rate might be 10 samples per minute.

Among other advantages not previously mentioned, the invention does not require employment of a resilient, normally open, constant diameter tube as in prior art air bubble type systems, for example. While the "chambers" have been indicated for purposes of illustration as bulged areas as, for example, in FIGURES 5 through 10, a typical "chamber" according to the invention will normally contain either some measured volume of liquid or else will be completely empty and in a flat state devoid of air as, for example, shown in respect to chamber 198 in FIGURE 14. Thus, the invention, unlike the prior art apparatus, requires neither a resilient wall nor one which is normally open. Further, the diameter of the tube or conduit employed in practicing the invention can vary in size and does not need to maintain or return to some constant value. In fact, the size of the conduit according to the invention will vary according to what is put into the conduit as seen by way of example in FIGURE 14.

In summary, it can be seen that the apparatus and methods of the invention meet the objectives originally set forth and from the description the versatility and simplicity of the invention become readily apparent. While there have been shown and described certain variants of the invention, the future application of the invention will make obvious to those skilled in the art many other variations and applications of the invention herein set forth. Therefore, the appended claims are expected to be construed within the spirit and scope of what is believed to be a pioneer invention and as validly and broadly as the state of the art permits.

What is claimed is:

1. Apparatus for processing of fluid in units comprising a first conduit for containing said fluid and providing a processing path the length of which corresponds to the length of said first conduit and along which said fluid units are moved and predetermined processing steps completed, said conduit having opposed portions capable of retractable movement relative to each other; sealing means for moving simultaneously a selected plurality of said portions in a manner effective to establish and continuously maintain both when stationary and when in motion along said path a plurality of releasable substantially perfect hydraulic seals across and spaced along the length of said path such that formation of said fluid into a stream is avoided throughout said path and said first conduit forms itself for its entire length as a plural series of hydraulically isolated chambers defined by said releasable seals and having said conduit as a common envelope and being adapted both when stationary and when in motion along said path to contain and isolate units of said fluid; second conduit means communicating with said first conduit and located at selected points along said path and providing means for selectively admitting and removing fluid from said chambers when the positions thereof coincide with the location of said points; and operator means for moving said sealing means relative to said first conduit to cause said seals and chambers to be operationally maintained and to move simultaneously and progressively along said path thereby enabling fluid confined in each such chamber to be admitted, processed and removed independent of operations performed in any other such chamber.

2. The apparatus of claim 1 including means operatively connected to said first conduit for performing unit handling and chemistry type processes upon the contents of selected said chambers independently of all other said chambers.

3. The apparatus of claim 1 wherein said first conduit comprises a continuous tube having a resiliently flexible wall and said sealing means continuously compresses said wall to effect and maintain said seals and divide the entire length of said tube into said chambers.

4. The apparatus of claim 3 including a cylindrical body member and wherein said tube assumes a continuous circular configuration mounted on said body member, said sealing means rotates around the axis thereof in continuous contact therewith and maintains said seals and chambers throughout the length thereof and said second conduit means mounts in said body member at said points to communicate with said chambers.

5. The apparatus of claim 1 wherein said first conduit comprises a body member providing an unbroken smooth surface defining and extending throughout the length of said path and an impervious sheet member covering said path and secured to said body member at the edges of said surface, said sealing means being adapted to maintain continuous contact with and to move said sheet member against said body member to perfect and continuously maintain said seals and chambers and wherein said second conduit means is mounted in said body member.

6. The apparatus of claim 1 including a body member having a cylindrical wall mounting said first conduit and wherein said sealing means includes a plurality of spaced roller means adapted to compress said conduit against said wall to perfect and continuously maintain said seals and chambers and said operator means rotates said roller means around the axis of said wall.

7. The apparatus of claim 5 wherein said impervious sheet member is adhered to said body member at a selected location to provide a non-releasable hydraulic seal blocking said path at such location and said second conduit means includes conduit means communicating with said first conduit at such location, thereby enabling said sealing means to force fluid out of each successive said chamber arriving at said location.

8. The apparatus of claim 1 including pump means communicating with said second conduit means at at least one of said points and operative to provide known constant volumes of fluid in selected ones of said chambers.

9. The method for establishing and processing of fluid units in a conduit the length of which corresponds to the length of a processing path along which predetermined processing steps are completed, and having opposed portions capable of retractable movement relative to each other and at least one opening spaced along the length thereof comprising the steps of: moving simultaneously a selected plurality of said portions in a manner effective to establish a plurality of spaced releasable substantially perfect hydraulic seals internally of said conduit such that formation of said fluid into a stream is avoided throughout said processing path and the entire length of said conduit is formed as said processing path and into a plural series of hydraulically isolated chambers defined by said seals and having the conduit as a common envelope; moving the seals relative to the conduit to cause the seals and chambers to move simultaneously and progressively along the entire length of said path thereby causing said chambers to be successively presented to said opening; and selectively adding, processing and removing fluid through said opening as each chamber is presented thereto according to a program of operations for the fluid unit in such chamber and independent of operations performed on the fluid unit in any other such chamber.

10. The method of claim 9 wherein said step of moving said portions comprises the step of continuously compressing said portions to form and continuously maintain the spacing and hydraulic effectiveness of said seals.

11. The method of claim 9 including the steps of: forming a permanent non-releasable seal internally of said conduit at a selected location and arranged so that the fluid in each chamber arriving at such location is divided into a plurality of portions some of which are free to flow past said location and others of which are blocked at such location; and moving each chamber and the fluid unit contained therein past said location thereby enabling said blocked portions to be removed at such location.

12. The method of claim 9 including the step of connecting said opening to constant volume pump means and exchanging known volumes of fluid through said opening with any chamber communicating therewith.

13. The method of claim 9 including the step of deforming selected said chambers externally of said conduit while said seals are moving and maintaining the resulting deformation for sufficient time to effect internal mixing in the contents of said selected chambers.

14. The method of claim 9 wherein said conduit further includes a permeable membrane mounted internally of and sealed to said conduit in a manner directed to establishing a subsidiary permeable conduit having closed ends and in said moving step to establish said seals, moving both said membrane and said conduit such that said seals and chambers are continuously formed in both said conduit and said subsidiary conduit and including the step of admitting a recipient fluid in the chambers so formed in said conduit and a donor fluid in the chambers so formed in said subsidiary conduit and during the step in which said seals are moving effecting dialysis between said recipient and donor fluids.

15. In an apparatus for processing of fluid in units along some predetermined path, a fluid housing having opposed portions capable of retractable movement relative to each other and being adapted to contain said fluid; forming means adapted to bring selected said opposed portions into substantially perfect hydraulic sealing relation so as to form and continuously maintain said housing as a series of hydraulically isolated chambers adapted to contain and continuously maintain in hydraulic isolation respective said units of fluid, said forming means being movable with respect to said housing and being adapted both when stationary and moving to maintain said isolation and when moving to operate on successive said portions to effect positioning of said seals and the respective said chambers formed thereby; conduit means establishing fluid communication with said housing at selected locations thereon; operator means for moving said forming means relative to said housing such that said chambers while being formed and continuously maintained by the presence of said seals follow some predetermined progressive processing path established by the course of said housing and which includes said locations; and processing means for processing said fluid at stations along said path, said processing means being dependent upon said fluid units being confined in said chambers in hydraulic isolation and said chambers while continuously maintaining said isolation being moved to said locations.

16. Apparatus for processing of fluid in units comprising a first conduit for containing said fluid and providing a processing path the length of which corresponds to the length of said first conduit and along which said fluid units are moved and predetermined processing steps completed, said conduit having opposed conduit portions capable of retractable movement relative to each other and comprising a body member providing a smooth surface defining and extending throughout the length of said path and an impervious sheet member covering said path and secured to said body member at the edges of said surface, said impervious sheet member being adhered to said body member at a selected location and in a manner effective to divide the fluid contents of any chamber arriving at such selected location into a plurality of fluid portions and further being effective to establish a permanent hydraulic seal blocking said path as to certain of said fluid portions and continuing said path as to others of said fluid portions; sealing means for moving simultaneously a selected plurality of said conduit portions in a manner effective to establish a plurality of spaced releasable substantially perfect hydraulic seals across and along the length of said path such that formation of said fluid into a stream is avoided throughout said path and said first conduit forms itself for its entire length as a plural series of hydraulically isolated chambers defined by said seals and having said conduit as a common envelope and being adapted to contain and isolate units of said fluid; said sealing means being adapted to move said sheet member against said body member to perfect said seals; second conduit means mounted in said body member and communicating with said first conduit and located at selected points along said path and providing means for selectively admitting and removing fluid from said chambers when the positions thereof coincide with the location of said points; said second conduit means including conduit means communicating with said first conduit at such selected location in the path of said certain fluid portions thereby enabling said sealing means to cause the fluid contents of each said successive chamber to be divided and said certain fluid portions to be forced out of such chamber at said selected location while said other fluid portions are continued past said selected location; and operator means for moving said sealing means relative to said first conduit to cause said seals and chambers to move simultaneously and progressively along said path thereby enabling fluid confined in each such chamber to be admitted, processed and removed independent of operations performed in any such chamber.

17. Apparatus for processing of fluid in units comprising a first conduit for containing said fluid and providing a processing path the length of which corresponds to the length of said first conduit and along which said fluid units are moved and predetermined processing steps completed, said conduit having opposed portions capable of retractable movement relative to each other; sealing means for moving simultaneously a selected plurality of said portions in a manner effective to establish a plurality of spaced releasable substantially perfect hydraulic seals across and along the length of said path such that formation of said fluid into a stream is avoided throughout said path and said first conduit forms itself for its entire length as a plural series of hydraulically isolated chambers defined by said seals and having said conduit as a common envelope and being adapted to contain and isolate units of said fluid; second conduit means communicating with said first conduit and located at selected points along said path and providing means for selectively admitting and removing fluid from said chambers when the positions thereof coincide with the location of said points; means located proximate said first conduit at a selected location and operative on said first conduit to form a selected said chamber into a chamber of some predetermined known volume and additional means communicating with said first conduit at said selected location enabling the fluid contents of said selected chamber to be diluted to said known volume; and operator means for moving said sealing means relative to said first conduit to cause said seals and chambers to move simultaneously and progressively along said path thereby enabling fluid confined in each such chamber to be admitted, processed and removed independent of operations performed in any other such chamber.

18. Apparatus for processing of fluid in units comprising a first conduit for containing said fluid and providing a processing path the length of which corresponds to the length of said first conduit and along which said fluid units are moved and predetermined processing steps completed, said conduit having opposed portions capable of retractable movement relative to each other; sealing means for moving simultaneously a selected plurality of said portions in a manner effective to establish a plurality of spaced releasable substantially perfect hydraulic seals across and along the length of said path such that formation of said fluid into a stream is avoided throughout said path and said first conduit forms itself for its entire length as a plural series of hydraulically isolated chambers defined by said seals and having said conduit as a common envelope and being adapted to contain and isolate units of said fluid; second conduit means communicating with said first conduit and located at selected points along said path and providing means for selectively admitting and removing fluid from said chambers when the positions thereof coincide with the location of said points; auxiliary mixing means adapted to establish and maintain auxiliary releasable hydraulic seals partially across said path and between and relative to the seals established by said sealing means thereby inducing flow through substantially narrow areas and fluid mixing within each said chamber where so established; and operator means for moving said sealing means relative to said first conduit to cause said seals and chambers to move simultaneously and progressively along said path thereby enabling fluid confined in each such chamber to be admitted, processed and removed independent of operations performed in any other such chamber.

19. Apparatus for processing of fluid in units comprising a first conduit for containing said fluid and providing a processing path the length of which corresponds to the length of said first conduit and along which said fluid units are moved and predetermined processing steps completed, said conduit having opposed portions capable of retractable movement relative to each other; sealing means for moving simultaneously a selected plurality of said portions in a manner effective to establish a plurality of spaced releasable substantially perfect hydraulic seals across and along the length of said path such that formation of said fluids into a stream is avoided throughout said path and said first conduit forms itself for its entire length as a plural series of hydraulically isolated chambers defined by said seals and having said conduit as a common envelope and being adapted to contain and isolate units of said fluid; second conduit means communicating with said first conduit and located at selected points along said path and providing means for selectively admitting and removing fluid from said chambers when the positions thereof coincide with the location of said points; hydraulic seals extending partially across said path at spaced locations thereon and being effective in cooperation with said sealing means to create substantially narrow flow areas within said chambers thereby inducing fluid mixing therein; and operator means for moving said sealing means relative to said first conduit to cause said seals and chambers to move simultaneously and progressively along said path thereby enabling fluid confined in each such chamber to be admitted, processed and removed independent of operations performed in any other such chamber.

20. Apparatus for processing of fluid in units comprising a first conduit for containing said fluid and providing a processing path the length of which corresponds to the length of said first conduit and along which said fluid units are moved and predetermined processing steps completed, said conduit having opposed portions capable of retractable movement relative to each other; a body member providing a smooth surface defining and extending throughout the length of said path and an impervious sheet member covering said path and secured to said body member at the edges of said surface; sealing means for moving simultaneously a selected plurality of said portions in a manner effective to establish a plurality of spaced releasable substantially perfect hydraulic seals across and along the length of said path such that formation of said fluid into a stream is avoided throughout said path and said first conduit forms itself for its entire length as a plural series of hydraulically isolated chambers defined by said seals and having said conduit as a common envelope and being adapted to contain and isolate units of said fluid; said sealing means being adapted to move said sheet member against said body member to perfect said seals; second conduit means mounted in said body member and communicating with said first conduit and located at selected points along said path and providing means for selectively admitting and removing fluid from said chambers when the positions thereof coincide with the location of said points; operator means for moving said sealing means relative to said first conduit to cause said seals and chambers to move simultaneously and progressively along said path thereby enabling fluid confined in each such chamber to be admitted, processed and removed independent of operations performed in any other such chamber; and dialysis means including an auxiliary permeable sheet member of length less than the length of said path and interposed between said impervious sheet member and said body member to form a subsidiary conduit within said first conduit, the ends of said permeable sheet member having its ends sealed to said body member across said path and its edges sealed to the edges of said surface, said second conduit means including first subsidiary conduit means communicating with said first conduit for admission of recipient fluid within a portion of said first conduit not having said permeable sheet member, second subsidiary conduit means communicating with said subsidiary conduit for admission of donor fluid to be confined between said permeable sheet member and said body member and third subsidiary conduit means communicating with said subsidiary conduit for discharge of said donor fluid, said sealing means and operator means being effective in cooperation with said permeable sheet member and subsidiary conduit means to effect dialysis between said donor and recipient fluids for that portion of said path occupied by said permeable sheet member.

21. Apparatus for processing of fluid in units comprising a first conduit containing said fluid and providing a processing path the length of which corresponds to the length of said first conduit and along which said fluid units are moved and predetermined processing steps completed, said conduit having opposed portions capable of retractable movement relative to each other; sealing means for moving simultaneously a selected plurality of said portions in a manner effective to establish a plurality of spaced releasable substantially perfect hydraulic seals across and along the length of said path such that formation of said fluid into a stream is avoided throughout said path and said first conduit forms itself for its entire length as a plural series of hydraulically isolated chambers defined by said seals and having said conduit as a common envelope and being adapted to contain and isolate units of said fluid; second conduit means communicating with said first conduit and located at selected points along said path and providing means for selectively admitting and removing fluid from said chambers when the positions thereof coincide with the location of said points; electrode means arranged within said conduit at a selected location such that any fluid confined in a chamber passing such location is placed in electrical contact therewith thereby enabling electrical measurement of such fluid; and operator means for moving said sealing means relative to said first conduit to cause said seals and chambers to move simultaneously and progressively along said path thereby enabling fluid confined in each such chamber to be admitted, processed and removed independent of operations performed in any other such chamber.

22. Apparatus for processing of fluid in units comprising a first conduit for containing said fluid and providing a processing path the length of which corresponds to the length of said first conduit and along which said fluid units are moved and predetermined processing steps completed, said conduit having opposed portions capable of retractable movement relative to each other; a body member providing a smooth surface defining and extending throughout the length of said path and an impervious sheet member covering said path and secured to said body member at the edges of said surface, said body member including a permanent chamber formed therein, means to draw said fluid into said permanent chamber and means located proximate said permanent chamber adapted to optically examine said fluid confined therein; sealing means for moving simultaneously a selected plurality of said portions in a manner effective to establish a plurality of spaced releasable substantially perfect hydraulic seals across and along the length of said path such that formation of said fluid into a stream is avoided throughout said path and said first conduit forms itself for its entire length as a plural series of hydraulically isolated chambers defined by said seals and having said conduit as a common envelope and being adapted to contain and isolate units of said fluid; said sealing means being adapted to move said sheet member against said body member to perfect said seals; second conduit means mounted in said body member and communicating with said first conduit and located at selected points along said path and providing means for selectively admitting and removing fluid from said chambers when the positions thereof coincide with the location of said points; and operator means for moving said sealing means relative to said first conduit to cause said seals and chambers to move simultaneously and progressively along said path thereby enabling fluid confined in each such chamber to be admitted, processed and removed independent of operations performed in any other such chamber.

23. Apparatus for processing of fluid in units comprising a first conduit for containing said fluid and providing a processing path the length of which corresponds to the length of said first conduit and along which said fluid units are moved and predetermined processing steps completed, said conduit having opposed portions capable of retractable movement relative to each other; sealing means for moving simultaneously a selected plurality of said portions in a manner effective to establish a plurality of spaced releasable substantially perfect hydraulic seals across and along the length of said path such that formation of said fluid into a stream is avoided throughout said path and said first conduit forms itself for its entire length as a plural series of hydraulically isolated chambers defined by said seals and having said conduit as a common envelope and being adapted to contain and isolate units of said fluid; second conduit means communicating with said first conduit and located at selected points along said path and providing means for selectively admitting and removing fluid from said chambers when the positions thereof coincide with the location of said points; means in said path for analyzing the contents of said chambers; and operator means for moving said sealing means relative to said first conduit to cause said seals and chambers to move simultaneously and progressively along said path thereby enabling fluid confined in each such chamber to be admitted, processed and removed independent of operations performed in any other such chamber.

24. Apparatus for processing of fluid in units comprising a first conduit for containing said fluid and providing a processing path the length of which corresponds to the length of said first conduit and along which said fluid units are moved and predetermined processing steps completed, said conduit having opposed portions capable of retractable movement relative to each other, portions of said first conduit being at a selected location sealed internally thereof and longitudinally in a manner effective to divide the fluid contents of any chamber arriving at such location into a plurality of chambers; sealing means for moving simultaneously a selected plurality of said portions in a manner effective to establish a plurality of spaced releasable substantially perfect hydraulic seals across and along the length of said path such that formation of said fluid into a stream is avoided throughout said path and said first conduit forms itself for its entire length as a plural series of hydraulically isolated chambers defined by said seals and having said conduit as a common envelope and being adapted to contain and isolate units of said fluid; second conduit means communicating with said first conduit and located at selected points along said path and providing means for selectively admitting and removing fluid from said chambers when the positions thereof coincide with the location of said points; and operator means for moving said sealing means relative to said first conduit to cause said seals and chambers to move simultaneously and progressively along said path thereby enabling fluid confined in each such chamber to be admitted, processed and removed independent of operations performed in any other such chamber.

References Cited
UNITED STATES PATENTS

| | | | |
|---|---|---|---|
| 2,865,303 | 12/1958 | Ferrari et al. | 103—149 |
| 2,987,004 | 6/1961 | Murray | 103—149 |
| 2,989,076 | 6/1961 | Rohmann | 251—6 X |

JOSEPH SCOVRONEK, Primary Examiner

U.S. Cl. X.R.

23—253, 258.5, 259; 103—7, 149; 204—195; 210—22, 321; 259—2, 72; 356—36, 246; 233—1